United States Patent
Xu et al.

(10) Patent No.: US 10,320,810 B1
(45) Date of Patent: Jun. 11, 2019

(54) MITIGATING COMMUNICATION AND CONTROL ATTEMPTS

(71) Applicant: Palo Alto Networks, Inc., Santa Clara, CA (US)

(72) Inventors: Zhi Xu, Fremont, CA (US); Cong Zheng, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 111 days.

(21) Appl. No.: 15/339,783

(22) Filed: Oct. 31, 2016

(51) Int. Cl.
*H04L 29/06* (2006.01)
*H04L 29/08* (2006.01)

(52) U.S. Cl.
CPC ........ *H04L 63/1408* (2013.01); *H04L 67/125* (2013.01); *H04L 67/303* (2013.01); *H04L 63/0254* (2013.01)

(58) Field of Classification Search
CPC . H04L 63/1408; H04L 67/125; H04L 67/303; H04L 63/0254
See application file for complete search history.

(56) References Cited

U.S. PATENT DOCUMENTS

| | | | | |
|---|---|---|---|---|
| 8,291,500 B1* | 10/2012 | Bojaxhi | ................ | H04L 63/145 713/188 |
| 8,402,543 B1* | 3/2013 | Ranjan | ................ | H04L 63/1416 709/223 |
| 8,555,388 B1* | 10/2013 | Wang | ................ | H04L 63/1416 709/245 |
| 9,430,646 B1* | 8/2016 | Mushtaq | ............. | H04L 63/1425 |
| 9,917,852 B1* | 3/2018 | Xu | ....... | H04L 63/1416 |
| 10,176,325 B1* | 1/2019 | Hou | ....... | G06F 21/566 |
| 2009/0172815 A1* | 7/2009 | Gu | ........ | G06F 21/552 726/23 |
| 2009/0228973 A1* | 9/2009 | Kumar | ................ | H04L 63/0272 726/15 |
| 2013/0124924 A1* | 5/2013 | Kawaguchi | ......... | G06F 11/3612 714/38.1 |
| 2014/0047544 A1* | 2/2014 | Jakobsson | ............... | G06F 21/55 726/23 |
| 2014/0089193 A1* | 3/2014 | Boding | ................ | G06Q 20/382 705/44 |
| 2014/0359761 A1* | 12/2014 | Altman | ................ | H04L 63/145 726/22 |

(Continued)

OTHER PUBLICATIONS

Xu et al., "Chinese Taomike Monetization Library Steals SMS Messages", downloaded from: http://researchcenter.paloaltonetworks.com/2015/10/chinese-taomike-monetization-library-steals-sms-messages/, Oct. 21, 2015.

(Continued)

*Primary Examiner* — Michael Pyzocha
(74) *Attorney, Agent, or Firm* — Van Pelt, Yi & James LLP

(57) ABSTRACT

The profiling and fingerprinting of communication and control (C&C) infrastructure is disclosed herein. An initial C&C profile is transmitted to a first network monitoring system. The initial C&C profile includes at least one of: (1) a domain corresponding to a C&C channel, and (2) a C&C pattern corresponding to a C&C channel. At least in part in response to information received from a second network monitoring system, the initial C&C profile is revised. An updated C&C profile is transmitted to the first network monitoring system.

27 Claims, 11 Drawing Sheets

(56) References Cited

U.S. PATENT DOCUMENTS

| | | | | |
|---|---|---|---|---|
| 2014/0373148 | A1* | 12/2014 | Nelms | H04L 63/1425 |
| | | | | 726/23 |
| 2015/0195299 | A1* | 7/2015 | Zoldi | H04L 63/1433 |
| | | | | 726/25 |
| 2015/0264070 | A1* | 9/2015 | Harlacher | H04L 63/1408 |
| | | | | 726/23 |
| 2016/0234232 | A1* | 8/2016 | Poder | H04L 63/1425 |
| 2016/0255107 | A1* | 9/2016 | Qian | H04L 63/1425 |
| | | | | 726/23 |
| 2016/0313237 | A1* | 10/2016 | Young | G01N 21/31 |
| 2017/0163603 | A1* | 6/2017 | Xu | H04L 63/1416 |
| 2017/0171244 | A1* | 6/2017 | Vissamsetty | H04L 63/1491 |
| 2017/0180402 | A1* | 6/2017 | Finnig | G06F 21/563 |
| 2017/0230393 | A1* | 8/2017 | Nelms | H04L 63/1425 |
| 2017/0364576 | A1* | 12/2017 | Chesla | H04L 63/1441 |
| 2018/0046799 | A1* | 2/2018 | Kohavi | G06F 21/56 |
| 2018/0069883 | A1* | 3/2018 | Meshi | G06N 20/00 |
| 2018/0070268 | A1* | 3/2018 | Iwai | H04W 28/22 |
| 2018/0152467 | A1* | 5/2018 | Anderson | H04L 41/16 |

OTHER PUBLICATIONS

Xu et al., "We Know It Before You Do: Predicting Malicious Domains", In Virus Bulletin, Sep. 2014.

Wei et al., "Sidewinder Targeted Attack against Android in the Golden Age of Ad Libraries", Black Hat USA, 2014.

Lu et al., "Checking More and Alerting Less: Detecting Privacy Leakages via Enhanced Data-flow Analysis and Peer Voting", In Proceedings of NDSS, 2015.

Gu et al., "BotSniffer: Detecting botnet command and control channels in network traffic." 2008.

* cited by examiner

US 10,320,810 B1

MITIGATING COMMUNICATION AND CONTROL ATTEMPTS

BACKGROUND OF THE INVENTION

Software applications, such as a mobile application, sometimes make use of one or more communication and control (C&C) channels with remote master servers. In the mobile ecosystem, a C&C channel is typically considered a neutral term, representing the interaction/data exchanges between a set of installed applications and a remote master server. In some cases, the C&C channels may be included in software surreptitiously by the software authors for nefarious purposes (e.g., to leak sensitive information to the authors). However, C&C channels can also be used for legitimate purposes. For example, an embedded analytics SDK might be used by a legitimate application to help improve software quality by reporting information about devices onto which the SDK is deployed to a master server. Unfortunately, if an otherwise legitimate master server and/or C&C channel fall into the hands of nefarious entities, legitimate applications configured to use the SDK/C&C channel can potentially be compromised. There is an ongoing need for improvements to software and computer/other infrastructure.

BRIEF DESCRIPTION OF THE DRAWINGS

Various embodiments of the invention are disclosed in the following detailed description and the accompanying drawings.

DETAILED DESCRIPTION

Figure 1:
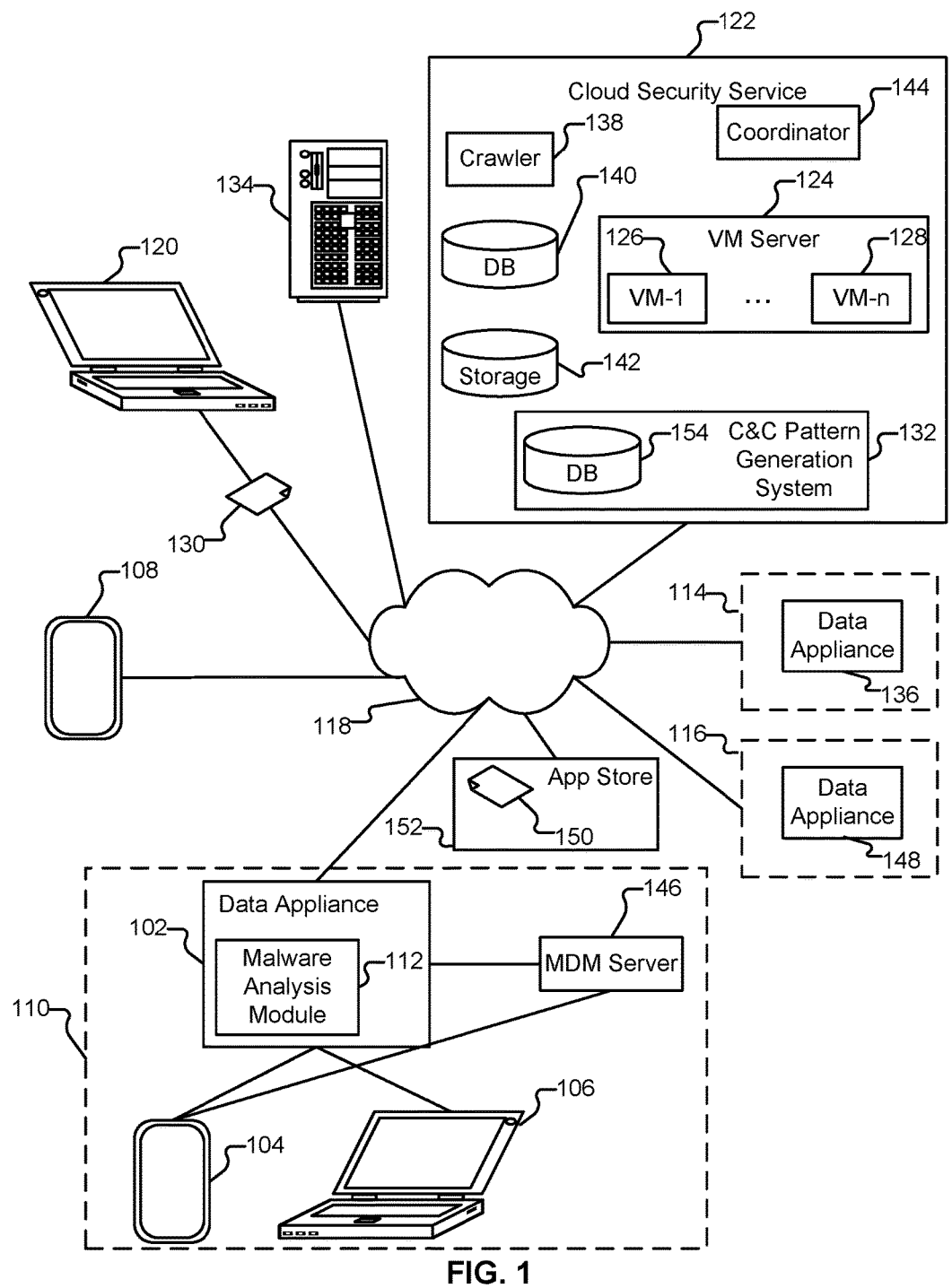
FIG. 1 illustrates an example of an environment in which command and control (C&C) infrastructure is identified and monitored.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

FIG. 1 illustrates an example of an environment in which command and control (C&C) infrastructure is identified and monitored. As will be described in more detail below, observations made about command and control infrastructure (e.g., as collected through both sample analysis and traffic analysis) can be shared (e.g., by C&C pattern generation system 132) among various entities included in the environment shown in FIG. 1. And, using techniques described herein, devices, such as endpoint devices 104 and 106, can be protected against malicious uses of such command and control infrastructure.

The term "application" is used throughout the Specification to collectively refer to programs, bundles of programs, manifests, packages, etc., irrespective of form/platform. An "application" can be a standalone file (e.g., a calculator app having the filename calculator.apk) and can also be an independent component of another application (e.g., a mobile advertisement SDK embedded within the calculator app). "Malware" as used herein refers to an "application" that engages in behaviors, whether clandestinely or not, of which a user does not approve/would not approve if fully informed (whether illegal or not). Examples of malware include Trojans, viruses, rootkits, spyware, adware, hacking tools, keyloggers, personal information collectors, etc. One particular example of mobile malware is a malicious Android Application Package .apk (APK) file that appears to an end user to be a free game, but stealthily sends SMS premium messages (e.g., costing $10 each), running up the end user's phone bill. Another example of mobile malware is a flashlight application that stealthily collects the user's contacts and sends them to a spammer. Yet another example of mobile malware is an application that collects and reports to a remote server the end user's location (but does not offer location-based services to the user, such as a mapping service).

Some malware, such as the malware described above, is specifically created and distributed for malicious purposes. In other cases, initially legitimate applications may subsequently be compromised and effectively transformed into malware. One example of how a legitimate application can be appropriated for nefarious purposes is as follows. Suppose mobile app 150 is a legitimate (e.g., non-malicious) app that provides users with local weather information. App 150 is freely available to end users (e.g., who can download app 150 from a software distribution platform such as platform 134 (also referred to as an "app store")). Example embodiments of platform 152 include Google Play, the iOS App Store, BlackBerry World, the Windows Phone Store, and the Amazon Appstore. Additional examples of software distribution platforms include third party software distribution platforms, such as the Baidu App Store, GetJar, and Handango.

An Android application typically comprises components provided by the application author, as well as components provided by one or more third parties (such as mobile advertising SDKs, analytics SDKs, and/or framework SDKs). Once installed, the different components in an Android application will establish C&C channels with their respective master servers.

When a master server/domain is abandoned by its original owner, it becomes a "zombie" C&C channel. Applications and the C&C channel often remain functional after such abandonment and do not expire. If a user installs an app with a client expecting to contact the C&C channel, the app will likely try to connect to the abandoned remote master server. Whoever reclaims control of the remote master server will be able to influence applications connected with the zombie C&C channel.

A C&C channel within an application typically includes three components: a client-side component, the C&C protocol, and the remote master server. The client-side component is the code within the application that is under control of the remote master server. Common capabilities of the client-side component include uploading collected information, downloading contents, taking actions upon received instructions, etc. If the client-side component is implemented as an SDK, the capabilities of the client are typically limited by the original implementation of the SDK. However, legitimate SDKs are often given access to very sensitive resources, such as current system status, location services, SMS services, camera services, and even command executions. The following are three examples of common behaviors of legitimate SDKs, and how they can be leveraged by zombie C&C channels:

Example 1

Collecting private information from users. Some SDKs, such as an advertising library, require permission to collect privacy information (e.g., IMEI, IMSI, device type, screen size, etc.) to facilitate functionality such as ad distribution. Aggressive SDKs may also collect more highly sensitive privacy information (e.g., fine-grained location, steal the incoming SMS messages). Zombie C&C channels will also likely want access to such information.

Example 2

Automatically downloading applications and promoting their installation. This functionality could be used by adversaries for the malware distribution at a large scale.

Example 3

Enabling the JavaScript Interface in Webview to load and show advertisements in the SDK. If the specified URL is a phishing webpage, users could be phished. Further, a remote code execution attack can be launched through the JavaScript Interface. For Android devices running versions of Android before 4.2, malicious JavaScript inside the webpage can use Java reflection to acquire a reference to a runtime object via the JavaScript Interface, and then it can call any Android APIs with corresponding permissions.

Increasingly, mobile application authors are developing applications using HTML5 and JavaScript (e.g., due to cross-platform benefits). HTML5-based mobile applications rely on "web containers," which are provided by each of the mainstream mobile operating systems to render HTML content and execute JavaScript programs. In Android, the name of the web container is WebView. In iOS, it is called UIWebView. For HTML5-based applications, the client-side component is typically a middleware framework (e.g., PhoneGap, RhoMobile, AppMobi, Mosync, etc.). Abandoned domains are typically more dangerous in the context of HTML5-based clients than with SDKs. Adversaries can not only send commands by faking server responses, but can also inject and execute JavaScript programs through zombie C&C channels. Further, middleware frameworks often grant powerful capabilities to application web content by default to help developers provide richer experiences. Further, HTML5-based applications often install plug-ins to enable web content to access system resources by invoking native Java APIs. Examples of such plug-ins include:

Example 1

File/FileTransfer Plug-in: Allows web content read/write access to files residing on the device.

Example 2

EmailComposer Plug-in: Allows web content to edit/send an email message using the standard interface.

Example 3

SMSComposer Plug-in: Allows web content to send SMS messages in Android using the native SMS Manager.

Example 4

ShellExec Plug-in: Allows web content to execute arbitrary code in a shell.

Example 5

LaunchMyApp Plug-in: Allows web content to start any application.

Returning to the example of FIG. 1, suppose app 150 incorporates an embedded mobile advertising software development (SDK) to support development. The advertising SDK used by app 150 makes use of a remote master server 134 to collect device/user/application information and deliver advertising content to end users. The SDK may also allow for the control of various behaviors of app 150 remotely. In exchange for incorporating advertising functionality into weather app 150, the developer of app 150 receives compensation from the SDK developer.

As mentioned above, SDK companies can fail, and/or mobile application authors can cease maintaining their applications. However, applications can continue to function (and continue to be available to new users for download via platform 152) after such events occur—sometimes for significant periods of time. Nefarious individuals can take advantage of such unmaintained applications. Using app 150 as an example, suppose the app is installed on end device 108 as of January 2016.

App 150 is programmed to communicate with platform 134 (e.g., to fetch advertisements and perform other tasks) via platform 134's domain name, "www.ACME-SDKsite.com," which was registered by the SDK company. The domain registration is paid for through June 2016. In the event platform 134 is not accessible, the weather app 150 will continue working (i.e., provide local weather information) but will not show advertisements. Suppose the SDK company fails in April 2016, and ceases operations at that time (including by taking platform 134 offline). As of April 2016, whenever instances of app 150 execute, they will be unable to reach platform 134, but continue to provide weather information. The author of app 150 could (e.g., if made aware that the SDK company was shutting down) revise app 150 to remove code associated with the SDK, could use a new SDK, etc. However, it may also be the case that the author of app 150 is unaware that the SDK company has failed and/or may no longer maintain the application. Even in the event that the author of app 150 does make changes to the app (i.e., removing use of the SDK), if users of app 150 do not update their copies of the app, their installed copies of the app will continue to attempt to communicate with platform 134.

In June 2016, the domain, www.ACME-SDKsite.com, expires (and is not renewed by the SDK company because it is no longer operating). The domain is now available for anyone to register. Suppose the domain is subsequently registered by a nefarious individual (using laptop 120). The domain, www.ACME-SDKsite.com, is an example of a "zombie" domain. Legitimate copies of app 150, functioning as originally intended by the author of app 150, will attempt to access the domain (e.g., to fetch advertisements). However, the site reachable via www.ACME-SDKsite.com is now provided by a nefarious individual, and not the SDK company. The nefarious individual can use the site to provide a zombie C&C channel, and influence any applications (e.g., installations of app 150) that connect to it. The nefarious individual can also intentionally target victims by transmitting copies of applications with the compromised zombie C&C channel. For example, the nefarious individual could attempt to compromise device 104 by transmitting a copy of the application (e.g., as an email attachment) to a user of device 104. Since zombie C&Cs and corresponding applications (e.g., app 150) are usually initially legitimate and have been published for a long time, typical defenses (e.g., an anti-virus program) will likely not stop the attack. In some cases, C&C channels make use of IP addresses instead of/in addition to domain names. A zombie C&C situation can also arise where an IP address (e.g., previously assigned to a legitimate C&C operator) is subsequently assigned to a different entity (but use of the IP address is hardcoded into an app, such as app 150).

In the example shown in FIG. 1, client device 108 runs an Android-based operating system and is owned by an individual hereinafter referred to as "Alice." Also included in FIG. 1 are client devices 104 and 106, which are a phone and a laptop (respectively) present in an enterprise network 110. (Client device 108 is outside enterprise network 110.) Client device 104 runs a version of iOS and client device 106 runs Windows 10.

Data appliance 102 is configured to enforce policies regarding communications between clients such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110. In some embodiments, other devices are included in network 110, such as a mobile device management (MDM) server 146, which is in communication with data appliance 102. As shown, MDM server 146 communicates with mobile devices (e.g., 104) to determine device status and to report (e.g., periodically) such mobile device status information to data appliance 102. MDM server 146 can be configured to report the presence of malicious applications installed on devices such as device 104, and/or can be configured to receive indications of which mobile applications are malicious (e.g., from appliance 102, from service 122, or combinations thereof). In some embodiments, data appliance 102 is configured to enforce polices against devices 104 and 106 based on information received from MDM server 146. For example, if device 104 is determined to have malware installed on it (or other unapproved types of applications), data appliance 102 (working in cooperation with MDM server 146) can deny device 104 access to certain enterprise resources (e.g., an Intranet) while allowing device 106 (which does not have malware installed upon it) access to the resources.

Figure 2:
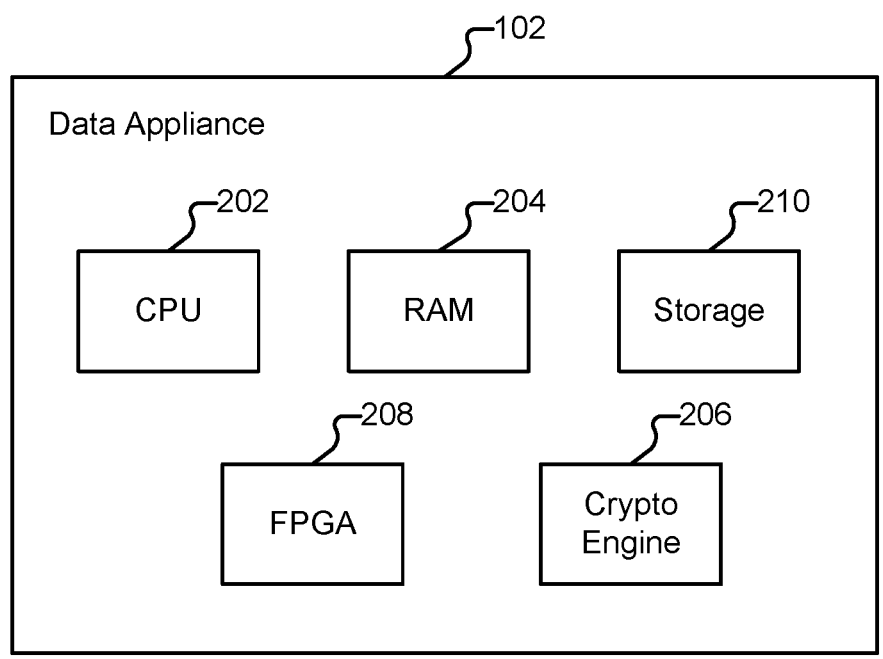
FIG. 2 illustrates an embodiment of a data appliance.

An embodiment of a data appliance is shown in FIG. 2. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a single, dedicated device (e.g., as shown), and can also be a set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 (or client 106) by an agent or other software executing at least partially on client 104 (or client 106).

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

Suppose data appliance 102 intercepts an email sent by laptop 120 to device 104 to which a copy of app 130 has been attached. As an alternate, but similar scenario, data appliance 102 could intercept an attempted download by device 104 of app 150 from platform 152. Data appliance 102 determines whether a signature for the attachment (i.e., app 130) is present on data appliance 102. A signature, if present, can indicate that the attachment is known to be safe, and can also indicate that the attachment is known to be malicious. If no signature for the attachment is found, in some embodiments, data appliance 102 is configured to provide the attachment (i.e., app 130) to a mobile malware analysis module 112 for real-time analysis. As will be described in more detail below, a combination of static and dynamic analysis can be performed on the application to determine whether it is malicious, and/or to otherwise classify it. As will further be described in more detail below, the static and dynamic analysis can be performed taking into account the various types of components used to author the application. As will further be described in more detail below, an application initially determined to be not-malicious (e.g., app 150 while the SDK company was operating) can be re-classified as additional information about the application becomes known.

As mentioned above, analysis of app 130 can be performed on premise (at the enterprise). For example, the analysis can be performed by a malware analysis module 112 included in data appliance 102. Instead of or in addition to on-premise analysis, appliance 102 can also send a copy of app 130 to cloud security service 122 for analysis. Further, cloud security service 122 can also (or instead)

obtain copies of mobile applications for evaluation from sources other than data appliance 102. As one example, cloud security service 122 can include a crawler 138 configured to periodically crawl platform 152 (or other sources of apps, such as websites), looking for new or updated applications. Such applications can then be analyzed by cloud security service 122. In some embodiments, platform 152 makes copies of applications available to cloud security service 122 via an Application Programming Interface (API) made available by service 122, instead of or in addition to crawler 138 obtaining such copies. Further, in various embodiments, cloud security service 122 and/or malware analysis module 112 are incorporated into platform 152.

Copies of received applications (i.e., awaiting analysis) are stored in storage 142 and analysis is commenced (or scheduled, as applicable). As will be described in more detail below, results of the analysis (and additional information pertaining to the applications) are stored in database 140, as is, in some embodiments, information pertaining to components incorporated into various applications.

Cloud security service 122 can comprise one or more dedicated commercially available hardware servers (e.g., having multi-core processor(s), 8G+ of RAM, gigabit network interface adaptor(s), and hard drive(s)) running typical server-class operating systems (e.g., Linux). In various embodiments, service 122 is implemented across a scalable infrastructure comprising multiple such servers, solid state drives, and/or other applicable high-performance hardware. Cloud security service 122 can comprise several distributed components, including components provided by one or more third parties. For example, portions or all of cloud security service 122 can be implemented using the Amazon Elastic Compute Cloud (EC2) and/or Amazon Simple Storage Service (S3). Further, as with data appliance 102, when cloud security service 122 is referred to as performing a task, such as storing data or processing data, it is to be understood that a sub-component or multiple sub-components of cloud security service 122 (whether individually or in cooperation with third party components) may cooperate to perform that task. As one example, cloud security service 122 can optionally perform its analysis in cooperation with one or more virtual machine (VM) servers, such as VM server 124.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers cloud security service 122, but may also be provided by a third party. As one example, the virtual machine server can rely on EC2, with the remainder portions of cloud security service 122 provided by dedicated hardware owned by and under the control of the operator of cloud security service 122. As will be explained in more detail below, virtual machine server 124 is configured to provide one or more virtual machines 126-128 for emulating mobile devices. The virtual machines can execute a variety of operating systems and/or versions thereof. Observed behaviors resulting from executing mobile applications in the virtual machines are logged and analyzed (e.g., for indications that the application is malicious). In some embodiments the log analysis is performed by the VM server (e.g., VM server 124). In other embodiments, the analysis is performed at least in part by other components of service 122, such as coordinator 144.

In some embodiments, cloud security service 122 makes available the results of its analysis of mobile applications via a list of signatures (and/or other identifiers) to appliance 102 (and/or to MDM server 146) as part of a subscription. For example, service 122 can send a content package that identifies malware apps periodically (e.g., daily, hourly, or some other interval, and/or based on an event based on a policy). An example content package includes a listing of identified malware apps (e.g., information in the content package can include an app package name, an app hash code for uniquely identifying the app, and a malware name for each identified malware app). The subscription can cover the analysis of just those files intercepted by data appliance 102 and sent to cloud security service 122 by data appliance 102, and can also cover signatures of all malware known to cloud security service 122 (or subsets thereof, such as just mobile malware but not other forms of malware (e.g., PDF malware)). Further, in some embodiments, cloud security service 122 is configured to provide security services to entities in addition to or instead of an operator of data appliance 102. For example, other enterprises, having their own respective enterprise networks 114 and 116, and their own respective data appliances 136 and 148 can contract with the operator of service 122. Other types of entities can also make use of the services of cloud security service 122. For example, a carrier providing cellular service to device 108 can contract with cloud security service 122 to analyze applications which device 108 attempts to download. As another example, the owner of device 108 can contract with cloud security service 122 to analyze applications. As yet another example, an operator of app store 152 can contract with cloud security service 122 to analyze mobile applications (e.g., for a fee).

In the event app 130 is determined to be malicious (whether by cloud security service 122 or by data appliance 102), appliance 102 can be configured to automatically block the file download based on the analysis result. Further, a signature can be generated for app 130 and distributed (e.g., to other data appliances) to automatically block future file transfer requests to download the file determined to be malicious.

In the following section, approaches to performing sample analysis (e.g., static and dynamic analysis) of mobile applications will be described. Information obtained through sample analysis can be combined with information obtained through traffic analysis associated with the application (e.g., as observed by data appliances 102, 136, and/or 148). Using techniques described herein, applications such as app 150 which may initially be determined (e.g., by service 122) to be not-malicious can have their verdicts revised as additional information associated with the app is obtained. Accordingly, using techniques described herein, C&C infrastructure can be profiled and fingerprinted (e.g., by traffic between server 134 and clients, such as one embedded in app 150 as installed on devices such as devices 104-108). The information gained about C&C infrastructure can be used to provide better visibility and control over C&C traffic, including by (e.g., appliance 102) blocking all C&C traffic that leaks a user's location information, or blocking all C&C traffic to servers (e.g., server 134) outside a geographic area (e.g., the United States). Further, using techniques described herein, devices such as devices 104-108 can be protected from a variety of C&C attacks (including zombie C&C attacks).

Analyzing Mobile Applications

Overview

Figure 3:
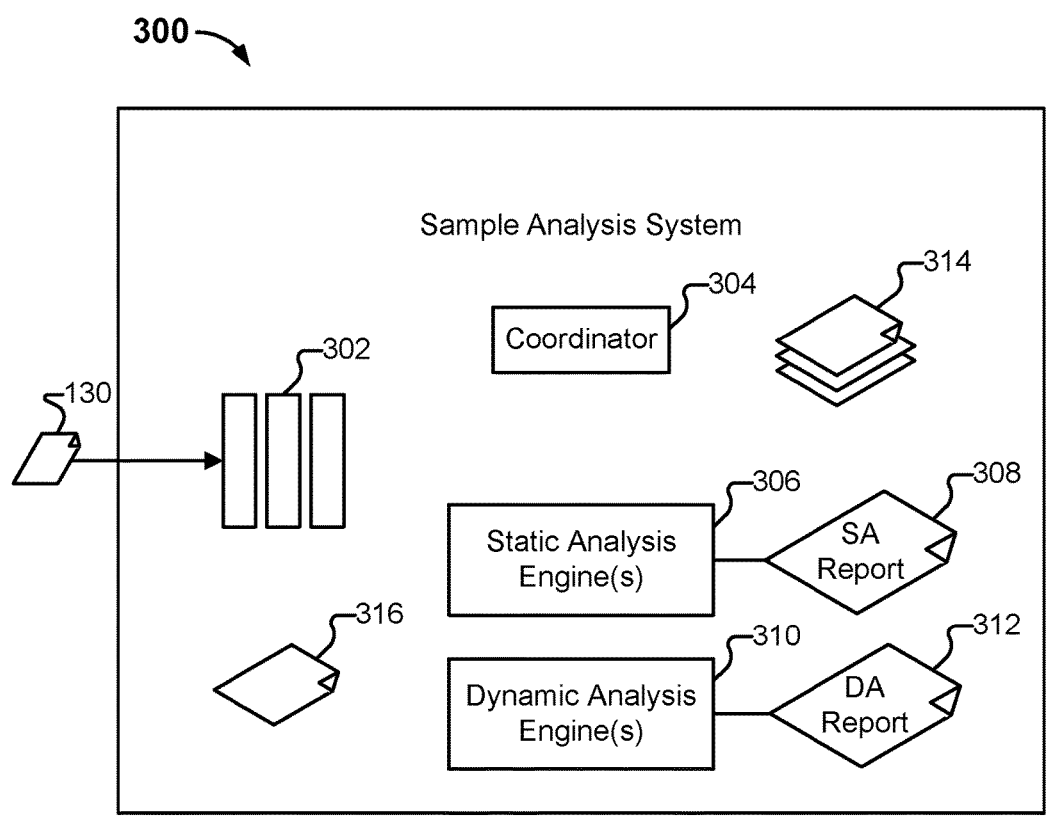
FIG. 3 illustrates an example of logical components included in a system for performing static and dynamic sample analysis.

FIG. 3 illustrates an example of logical components included in a system for performing static and dynamic sample analysis on a mobile device application. As explained above, system 300 can be implemented using a single device. For example, the functionality of system 300 can be implemented on data appliance 102 which includes an analysis module 112. System 300 can also be implemented, collectively, across multiple distinct devices. For example, the functionality of system 300 can be provided by cloud security service 122.

As will be described in more detail below, system 300 is configured to perform a two part analysis on mobile device applications, including by performing static and dynamic analysis. The two-phase approach helps improve the accuracy of mobile malware detection, while lowering the false positive rate of mislabeling benign application files as malware (e.g., due to harmless but poor programming techniques on the part of the application's author; or by including a common third party library, such as a legitimate advertising library, that requires permissions not otherwise used by the application).

During the static analysis portion of the analysis, the application (also referred to herein as a "host application" or "host APK") is reversed into a "reversed host application" (also referred to herein as a "reversed host APK"). The reversed host application is (in some embodiments) a directory structure (e.g., including one or more subdirectories) of source (and/or intermediate) code and resource files reversed from a given host application. In various embodiments, during static analysis, the structure of the APK file is examined (e.g., by reading the META-INF/CERT. SF) and parsing the DEX file format for classes.dex is performed.

In some embodiments, the code is aggregated into libraries based on the developers of and/or functionality provided by the code. The libraries can be grouped (e.g., based on whether a given library or code is provided by the developer, a commonly used third party library, or unrecognized). As one example, a mobile game application will typically include code written by the game's developer (e.g., providing the logic of how the game operates), as well as third party code. Examples of such third party code include an animation library to assist in rendering graphics, an advertising library that allows users of the game to play for free in exchange for viewing advertisements (with the game developer receiving a cut of the advertising revenue), and a payment system library to collect "in-app" payments from users. Other examples of third party code/libraries include those that provide accessorial functionalities such as mobile advertisement, usage statistics, encryption/coding, and social networking. The third party code typically is not directly related to the host application and in some cases may run autonomously from the host application after installation. At least some of these libraries might be very common (e.g., many applications available from platform 152 might incorporate the same third party advertising library). Any such commonly used libraries (e.g., provided by well known vendors) incorporated into an application are included in what is referred to herein as the "common" group. Analysis of a given application can be made more efficient by focusing the analysis on those portions of an application that are not common across large numbers of applications (i.e., the portions not belonging to the "common" group). An application's components which are not included in the "common" group are referred to herein as belonging to the "uncommon" group of code/libraries. The "uncommon" group can further be subdivided into the "core group" (i.e., code/libraries which are developed by the host application developer for the main functionality of the host application) and into the "unrecognized group" (i.e., third party code that is not well-known, code with a malicious payload added, repackaged malicious code, etc.).

During the dynamic portion of the analysis, behaviors performed by the application are analyzed (e.g., to check whether the application uses its capabilities suspiciously/maliciously). As will be described in more detail below, heuristics can be used in conjunction with dynamic analysis to determine whether a particular behavior, when executed by a particular library, should be considered malicious.

A final verdict pertinent to the application can be made based on both the application's content (e.g., where the application includes a URL verified to be a malicious website) and on the context in which it behaves (e.g., whether the usage of a suspicious capability is made aware to an end user or is performed silently in the background). As mentioned above, the application can also be classified without a maliciousness verdict being made. For example, an embodiment of system 300 can be configured to classify applications as using a particular SDK, without regard to whether or not the applications are in fact malicious.

In various embodiments, system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or service 122). Examples of information included in collection 314 are: URLs of known malicious websites; URLs of known safe websites; URLs (or other identifiers, such as IP addresses) of known C&C domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

Ingestion

In various embodiments, when a new mobile application is received for analysis (e.g., an existing signature associated with the mobile application is not present in system 300), it is added to processing queue 302. In the following example, suppose the application is called "weather.apk," (the app 130) but that it is not yet known whether or not the app is malicious. The Android application package "weather.apk" is an example of a "host APK."

As explained above, a mobile application for analysis can be received in a variety of ways. As one example, a mobile application can be received by data appliance 102 for analysis when data appliance 102 intercepts an email or other data transmission intended for device 104 that includes the application. Additional examples of the receipt of a mobile application include: (1) receipt by service 122 of the application from data appliance 102 or platform 152 for analysis (e.g., via an API), and (2) crawling by service 122 of systems such as platform 152 or a website.

Static Analysis

Coordinator 304 monitors the queue, and as resources (e.g., a static analysis worker) become available, coordinator 304 fetches an application from queue 302 for processing (e.g., fetches weather.apk). In particular, coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306).

The static analysis engine obtains general information about the application, and includes it (along with heuristic and other information described below) in a static analysis report 308. The report can be created by the static analysis engine, or by coordinator 304 (or by another appropriate component) which can be configured to receive the information from static analysis engine 306. In some embodiments, the collected information is stored in a database record for the application (e.g., in database 140), instead of or in addition to a separate report 308 being created (i.e., portions of the database record form the report 308). Examples of collected information include: the package name, shared UID, APK file signer information, permissions claimed, and sensitive API calls included in the source (e.g., sending or erasing SMS messages, accessing the phonebook, and tracking user location changes). The static analysis engine also collects and stores information pertaining to the running context of the application, such as: the minimum version of the Android OS required to run the application (the minimum SDK version), and the sensors it will have access to. As will be described in more detail below, the static analysis engine can evaluate the components of the application and include that information in the report as well.

One example of how static analysis can be performed, using game.apk as an example is as follows, and described in conjunction with the process shown in FIG. 4. Similar approaches can be used for mobile applications on other platforms (e.g., iOS applications or Windows Mobile applications). First (at 402), static analysis engine 306 uses a tool, such as Android Apktool, to reverse game.apk into an intermediate source code form. The output of the reversing operation is, in some embodiments, a set of .smali files—the direct output of the disassembly from Dalvik virtual machine language, and other resource files included in the game.apk file.

Figure 5:
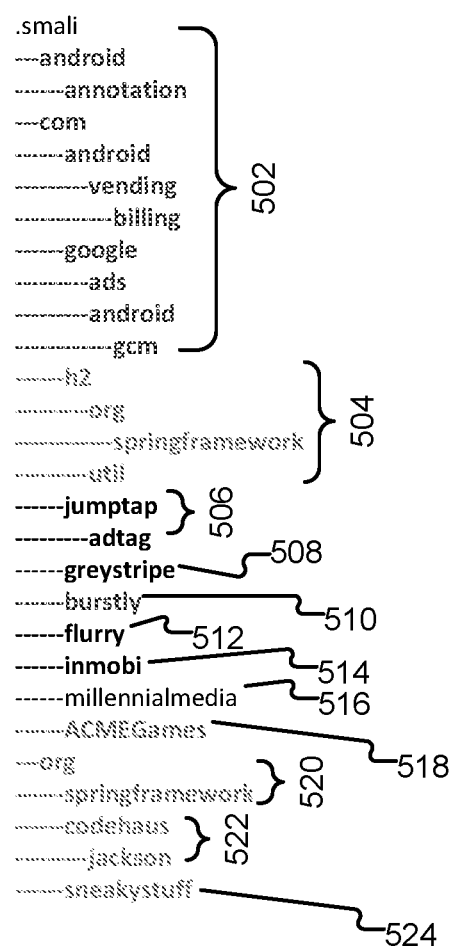
FIG. 5 illustrates an example representation of small information for an application.

An example representation of .smali information of a game made by a fictional company called ACME Games is shown in FIG. 5. Region 502 depicts various Google/Android libraries. Region 504 depicts a programming and configuration model for enterprise applications. Region 506 is a library that provides for advertisements, utilities, and statistics. Region 508 is a library that provides advertisements and statistics. Region 510 is a library that provides utilities, statistics, and application management. Regions 512 and 514 are libraries that provide advertisements and statistics. Region 516 is a library that provides utilities, statistics, and application management. Region 518 is where the actual game code is found. Region 520 depicts a programming and configuration model for enterprise applications. Region 522 is a library that provides utilities. Region 524 includes malicious code. A significant amount of the code included in the .smali information depicted in FIG. 5 was provided by a third party (i.e., not authored by the game developer). The .smali information for the weather.apk file would look similar, but would omit the malicious code of region 524.

Figure 4:
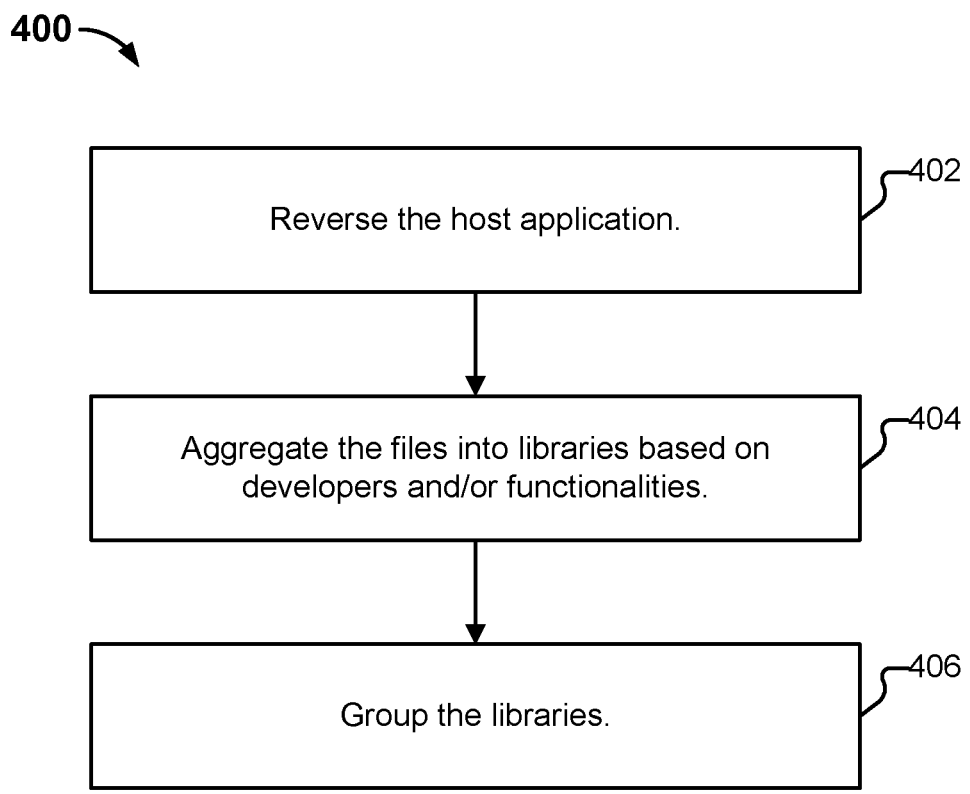
FIG. 4 illustrates an example of a process for performing static analysis.

Returning to process 400 shown in FIG. 4, at 404, static analysis engine 306 is configured to aggregate the reversed code (including resource files) into different libraries by analyzing the structures and organizations of the reversed information. At 406, static analysis engine 306 groups the libraries (e.g., based on their developers and/or functionality). As will be described in more detail below, members of the different groups can be treated differently (e.g., both during static and dynamic analysis).

A variety of techniques can be used to determine the aggregated libraries (404) and groupings (406), such as with respect to the .smali output shown in FIG. 5. As one example, code in a reversed APK can be aggregated into libraries based on connection relationships between the code (e.g., relations can be found in the AndroidManifest.xml file). As another example, a set of heuristics can be applied. Examples of such heuristics are as follows:

Heuristic 1: Aggregate code based on its class name hierarchy relationship. In the directory of reversed host APK, .smali files are organized by their class names. For example, the file "d.smali" in class "a.b.c" will have a directory structure as "/a/b/c/d.smali." All smali code under "/a/b/c" is treated as belonging in the same library.

Heuristic 2: The receiver entry code that launches the application likely belongs to the "core group." The libraries that belong to the core group handle most of the UI interactions and configurations.

Heuristic 3: Every .smali file includes one class name for the file itself, and a list of classes that are referred to in this file. The class name (and any files that have references to it) can be aggregated into one library.

Heuristic 4: Every host APK has a unique package name. Code with the same name as the package name is aggregated into one library and that library is included in the common group.

Heuristic 5: The structure of well-known popular libraries can be determined through statistical analysis. As examples, the information shown in FIG. 5 can be divided into libraries "com.google" (Google libraries 502), "com.h2" (an enterprise app development framework 504), "com.inmobi" (mobile ads library 514), "com.flurry" (mobile ads library 512), "org.codehaus.jackson" (utility library 522), "com.ACME-Games" (the part implementing the game 518), etc.

Heuristic 6: A library is grouped into the "unrecognized" group if it shares a name with a popular common library but its code is different from that popular library. One way this can be accomplished is by collection 314 including hashes or other information about common libraries, such as "com.android.vending.billing," and comparing the code alleging to be "com.android.vending.billing" included in game.apk against the information stored in collection 314.

Heuristic 7: Libraries included in the common group are selected based on statistics obtained across a large collection of applications. In some embodiments, the set of common libraries is cultivated (e.g., by contacting the official authors of the libraries or otherwise obtaining canonical versions of the libraries). The common libraries can be subdivided based on the functionality they provide, and that functionality can be used for classifying the applications that incorporate those libraries. Examples of such classifications include: Utilities (e.g., "android.support.v4," "com.android.vending.billing"), Ads (e.g., "com.inmobi," "com.flurry"), Social Networking (e.g., "com.facebook.android," "twitter4j"), App Marketing (e.g., "com.appbrain"), Game Development Framework, etc.

Heuristic 8: Code belonging to the same library will have many inter-references, and code belonging to different libraries should have no or very few connections. As a result, a threshold value of connections between two source files can be used to determine whether they belong to the same library.

In some embodiments, the grouped libraries are provided as output (e.g., in static analysis report 308) for use during dynamic analysis. As one example, the report for the .smali information shown in FIG. 5 could indicate that the core group for game.apk includes library 518; the common group for game.apk includes libraries 502 (which could be grouped together into a single library or considered as multiple libraries), 504, etc.; and the unrecognized group for game.apk includes library 524.

Other kinds of static analysis can also be performed by static analysis engine 306 for inclusion in the report. For example, in addition to the heuristic rules to be applied on the .smali code for library and grouping purposes, static analysis engine 306 can use heuristic rules to determine which features are hit by the source code. For example, if the APK has duplicate entry names (e.g., containing two classes.dex files in the same folder within the APK) in the file, it is malicious. (E.g., because it is attempting to exploit the Android security vulnerability #8219321.) Examples of features include the following (where an example of "the host APK" is "game.apk"):

1. "Contain APK file": If the received APK contains other APK files within the package, the host APK is suspicious.
2. "Contain Known Malicious APK File": If there exists other APK files within the package, those included APK files are analyzed separately (e.g., are added to the queue or checked with existing known malicious applications). If any of the included APK files are determined to be malicious, the received APK is considered malicious as well.
3. "Hide Menu Icons": The menu icons are graphical elements placed in the options menu. If the received APK does not have the menu icons or attempts to hide the menu icons, it is suspicious.
4. "File Type Mismatch": If the received APK contains files whose formats do not match their extensions, it is highly suspicious (of maliciousness). For example, several Android malware families (e.g., Android.Droiddream family) attempt to hide additional included APK files as database files by naming them with the ".db" extension rather than ".apk." As another example, a file labeled a ".png" may instead be an ".xml" file used for a command and control channel. As explained below, a developer may inadvertently misname a file (or otherwise misname a file without malicious intent).
5. "Contain Executable Files": If the received APK contains executables for the Linux platform (e.g., the .elf files), it is suspicious.
6. "Contain Malicious Executable Files": If the included executable files are known malicious files, e.g., known exploit libraries, the received APK is malicious.
7. "Install Other APK": If the received APK has the capacity of installing other APK files (e.g., while running in the background), it is suspicious.
8. "Uninstall Other APK": If the received APK has the capacity of uninstalling other APK files (e.g., while running in the background), it is suspicious.
9. "Contain Dangerous Shell Commands": If the received APK contains dangerous shell commands, e.g., chmod and su, it is malicious.
10. "Require Abnormal Permissions": If the received APK requires permissions such as "system debug," or "authenticate accounts," and/or factory adjustments such as setting process limits, it is suspicious.
11. "Contain Phone number": If the received APK contains phone number(s), it is suspicious (e.g., because the application may place calls or text messages to premium numbers).
12. "Contain URLs": If the received APK contains URL(s) within the source code, it is suspicious.
13. "Contain Malicious URL": Any URL(s) found are compared against a list of known malicious sites. If the URL(s) link to malicious site(s), the received APK is malicious.
14. "Send SMS": If the APK has the permission to send SMS messages, it is suspicious.
15. "Contain Autorun.inf file": If the received APK contains an autorun.inf file that is for the Windows platform, it is malicious (e.g., because an attempt will be made by the user's computer to execute the file if the user connects the phone to the computer).
16. "Duplicate Entries": If the APK has duplicate entry names (e.g., containing two classes.dex files in the same folder within the APK) in the file, it is malicious. (E.g., because it is attempting to exploit the Android security vulnerability #8219321.)

In some embodiments, static analysis engine 306 takes into account the group to which a library responsible for a feature hit belongs when determining whether a given hit is suspicious or malicious. One example is where a library in the common group includes code for certain "suspicious" activities (e.g., hiding or attempting to hide menu icons, or calling/containing additional executable files, or including a phone number) that could be resolved by the static analysis engine as not suspicious. In some embodiments, at least some feature hits will be treated as malicious, irrespective of which classification of library (e.g., core, common, or unrecognized) includes the code. One example is: "contains malicious URL." In the case of the weather.apk file, as mentioned above, because the weather.apk file makes use of an advertising SDK, the weather.apk will include C&C information associated with the SDK.

Returning to FIG. 3, the static analysis engine stores the results of the rule testing a database (e.g., database 140) in the record associated with the application being tested (and/or includes the results in report 308 as applicable). In some embodiments, the static analysis engine also forms a verdict with respect to the application (e.g., "safe," "suspicious," or "malicious"). As one example, the verdict can be "malicious" if even one "malicious" static feature is present in the application. As another example, if the only "suspicious" code is attributable to libraries included in the common group, and no "malicious" code is found, the verdict can be "safe." As yet another example, points can be assigned to each of the features (e.g., based on severity if found; based on how reliable the feature is for predicting malice; etc.) and a verdict can be assigned by static analysis engine 306 (or the coordinator, if applicable) based on the number of points associated with the static analysis results. In this example, points can be assigned differently based on library groupings. For example, a "suspicious" hit from code in the unrecognized group can be assigned a higher score than a "suspicious" hit from code in the common group. As yet another example, the verdict can be "original" or "repackaged" (e.g., where static analysis engine 306 is configured to analyze applications for repackaging, only, without additional regard for maliciousness).

In some cases, an application may appear "suspicious" to static analysis engine 306 due to poor programming choices made by a harmless programmer, rather than a malicious one. As one example, the programmer may have named an executable that handles playing of an MP3 file with a ".mp3" extension. This sort of filetype mismatch (i.e., that an executable is incorrectly labeled with a non-executable extension) could indicate malicious behavior (i.e., a malicious individual is trying to hide a malicious executable through misnaming the filename). Here, however, the file was inadvertently mislabeled. Static analysis engine 306 notes (e.g., with rule "File Type Mismatch" being included in the static analysis report) that there is a "suspicious" aspect to the file which warrants additional investigation during dynamic analysis to reach a conclusion as to whether the application is benign or malicious.

In some embodiments, static analysis engine 306 will conclude that the application will crash (and/or cause the virtual machine to crash) if executed. As one example, static analysis engine 306 can perform integrity checking and determine that a file is missing, corrupted, unsigned, etc. In this scenario, dynamic analysis can be skipped (e.g., with static analysis noting in report 308 that the application will crash if an attempt is made to install/execute it).

Dynamic Analysis

Once the static analysis is complete, coordinator 304 locates an available dynamic analysis engine 310 to perform dynamic analysis on the application. As with static analysis engine 306, system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a mobile device emulator (e.g., running in a virtual machine). Results of the static analysis (e.g., performed by static analysis engine 306), whether in report form (308) and/or as stored in database 140, or otherwise stored are provided as input to dynamic analysis engine 310. The static report information is used to help customize the type of dynamic analysis performed by dynamic analysis engine 310, conserving resources and/or shortening the time required to evaluate an application. As one example, if static analysis has concluded that the application does not have the ability to access SMS messages, during dynamic analysis, the receipt of SMS messages will not be simulated in some embodiments. As another example, if static analysis has concluded that the only access the application has to a sensitive permission (e.g., the ability to read SMS messages) is via a library included in the common group, and is not via libraries in the core or unrecognized group, certain triggering actions (e.g., the receipt of SMS messages) can similarly not be simulated. As another example, if static analysis has concluded that the application has the ability to access GPS information, during dynamic analysis, various changes in location of the device can be simulated. However, if the application lacks the ability to access GPS information, in some embodiments no location changes will be simulated (reducing the amount of time/computing resources needed to complete dynamic analysis). Similarly, even where the application has the ability to access GPS information, if that information is only accessed via a library included in the common group, in some embodiments no location changes will be simulated.

Dynamic analysis engine 310 can determine which emulator(s) to run based on the minimum operating system version number required by the application (and determined during static analysis). If the minimum version number is Android 4.0, dynamic analysis engine 310 will launch an Android emulator having that version number (and, in some embodiments, will not attempt to emulate a lower version of Android). If the minimum version number is Android 2.3, multiple emulators can be used to evaluate the application (e.g., Android 2.3, and any higher versioned emulators, such as Android 4.0). Where multiple emulators are used, a single dynamic analysis engine can manage all of the emulators (whether in sequence or in parallel), or multiple dynamic analysis engines can be used (e.g., with each managing its own emulator), as applicable.

Figure 6:
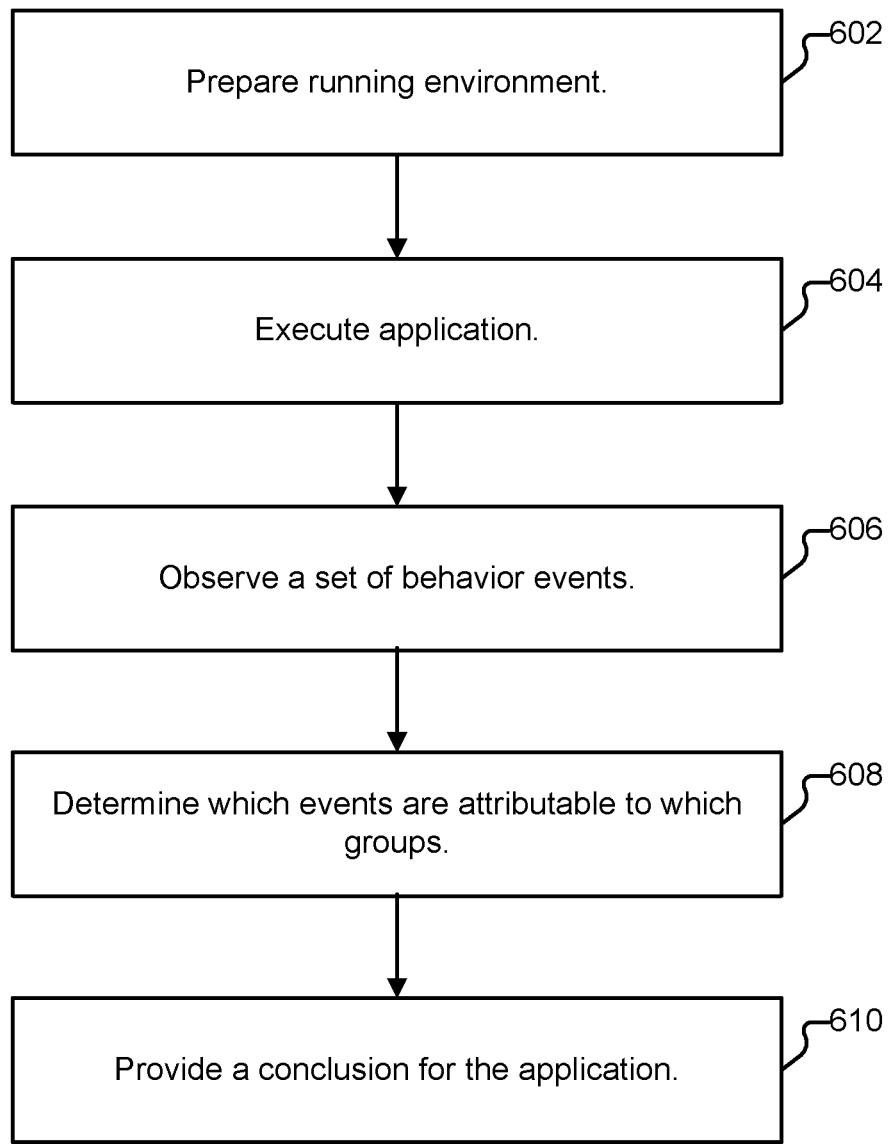
FIG. 6 illustrates an example of a process for performing dynamic analysis.

One example of how dynamic analysis can be performed on an application is as follows, and described in conjunction with the process shown in FIG. 6. The dynamic analysis engine/worker begins analysis by preparing and setting up the running environment for the application to be tested (602). As explained in more detail below, the environment is instrumented/hooked such that behaviors observed while the application is executing are logged and which libraries/classes are responsible for which behaviors is tracked. Examples of operations carried out by the dynamic analysis engine/worker at 602 include: (1) determining which system services should be started (e.g., simulated motion sensor readings and simulated location changes); and (2) determining what set of simulated user operations should take place (e.g., performed after installation, in sequence).

The dynamic analysis engine/worker loads an appropriate emulator (e.g., Android version 2.3) and installs the application to be analyzed. As mentioned above, the emulators used by sample analysis system 300 are instrumented. For example, they are configured to log activities as they occur in the emulator (e.g., using a customized kernel that supports hooking and logcat). Further, network traffic associated with the emulator is captured (e.g., using pcap). The generated log file (or a separate file associated with the log file, as applicable) indicates which library (and as applicable, which class or other subcomponent within the library) was responsible for the application engaging in a particular behavior. For example, when the application attempts to send an SMS, or access a device identifier, the library responsible for the occurrence of that behavior and its group classification (e.g., core, common, or unrecognized) is known and can be used in analysis. In some embodiments, dynamic analysis is performed in two stages. In particular, after the application has been installed and executed (with associated simulated information/events) and a first log file is created (e.g., "logcat1.txt"), a reboot of the emulator is performed and the application is launched and interacted with again, resulting in a second log file (e.g., "logcat2.txt"). Dynamic analysis engine 310 evaluates both log files, along with any network traffic captured during the two stages (e.g., using pcap).

Returning to process 600, the application is executed (604) and various applicable actions (e.g., selected based on static analysis report 308) are performed (e.g., by the dynamic analyzer executing commands via an Android Debug Bridge ("adb") connection and/or through the use of a service coordinator included in the modified emulator and configured to orchestrate the simulation of user events such as button presses as commanded by the dynamic analysis engine). As one example, if the application was determined during static analysis to have access to location information, changes in location will be simulated in the emulator. Any resulting behaviors performed by the application are logged (606). In some embodiments, the log data is stored as a temporary file on system 300. As explained above, the dynamic analysis engine is provided with group identity information as a result of the earlier performed static analysis. Thus for example, a read of a device identifier performed by a library included in the common group is differentiable (608) from a read of a device identifier performed by a library included in the uncommon group (whether core group or unrecognized group). When the device identifier read is performed by a library in the common group (e.g., performed by a well-known advertising library), that behavior can be considered not suspicious (i.e., is expected). In contrast, when the device identifier is read by a library in the uncommon group (whether core or unrecognized) that behavior is potentially malicious. As another example, an access of device contacts is permissible by a common group library. It may also be permissible where the main purpose of the application (i.e., functionality included in core group libraries and explicitly stated in the description of the application (e.g., appearing in the manifest or on platform 152)) is to be a contact manager. In contrast, where the read is performed by a library included in the unrecognized group, the behavior is highly suspicious.

As with the static analysis engine, the dynamic analysis engine stores the results of its analysis in the database in the record associated with the application being tested (and/or includes the results in report 312 as applicable). As will be described in more detail below, a variety of conclusions (also referred to herein sometimes as verdicts) can be made with respect to analyzed applications (e.g., at 610). In some embodiments, a final conclusion associated with the application is made (e.g., based on a combination of report 308 and report 312) by coordinator 304. Additional detail regarding various examples of conclusions that can be made based on techniques described herein will now be provided.

Example Conclusions
Malware Verdicts

A variety of approaches can be used to determine whether an application is malicious. As one example, the verdict can be "malicious" if even one "malicious" dynamic feature is present in the application. As another example, points can be assigned to each of the features (e.g., based on severity if found; based on how reliable the feature is for predicting malice; etc.) and a verdict can be assigned by dynamic analysis engine 310 (or the coordinator, if applicable) based on the number of points associated with the static analysis results. Considerations such as to which group a library responsible for a suspicious action belongs can be taken into account in determining a maliciousness verdict. For example:

When a host APK requires permissions to access a GPS, it may be the case that access is required by the developer (i.e. code in the core or unrecognized groups) or by well-know common libraries (i.e. code in the common group). Using the techniques described herein, a request for this sensitive privilege by code included in the core or unrecognized groups can be treated as more suspicious (whether in static analysis, dynamic analysis, or both) than a request made by code in included in the common library.

When a library is encountered with the same library name as a common library, but different code from that common library, the scenario is highly suspicious (i.e., that the library was injected with malicious code). As mentioned above, one way of tracking this information is by maintaining lists (316) of certificates or other verifications of canonical forms of common libraries and comparing purported common libraries (e.g., during static analysis) against the verified versions.

As explained above, different weights can be applied to feature hits by different libraries/groups. For example, the feature of "uploading a device ID to a remote website" when performed by a library included in the common group can be assigned a low weight (or score of zero, as applicable), since the library was authored by a renowned developer (who is, e.g., likely to be responsible for its code). However, the same feature hit performed by a library included in the unrecognized group can be assigned a much higher weight (e.g., contributing to a much higher maliciousness score). The use of different weights based on the library's grouping lowers the false positive rate and improves the detection rate.

In some embodiments, behavior taken by code in the core group is treated with less suspicion than when the same behavior is taken by code in the unrecognized group. Here, by virtue of being executed by code in the core group, the behavior is highly related to the application's main purpose. And, a user of the application is highly likely to be aware of the sensitive operations (if any) performed by code in the core group. In some embodiments, information such as the application's description on platform 152, its description in a manifest file, etc., are considered in evaluating the suspiciousness of an action. As one example, if the application is found (e.g., in dynamic analysis) to be "attempting to check if the phone is rooted," and the description of this application on platform 152 includes phrases such as "may need rooted device," then the attempts to determine whether the device is rooted would not be considered as suspicious behavior. As another example, as explained above, if the application purports to be a contact manager, and is described as being a contact manager on platform 152, then attempts by the application to access contacts (i.e., performed by core group libraries) are less suspicious than where the application is described as being a flashlight and the attempts to access contacts are performed by unrecognized group libraries.

Command and Control Pattern Generation

As mentioned above, an application (e.g., app 150) that is correctly initially classified as not-malicious (or suspicious, etc.) may subsequently become compromised or otherwise should no longer be appropriately classified as not-malicious. As also mentioned above, one way an application can become compromised is through a formerly benign C&C channel becoming a zombie C&C channel. In such a situation the application itself (e.g., as assessed through static and dynamic analysis) may not have changed, and thus its fingerprint/hash/etc. may also not have changed. Accordingly, without additional information, a data appliance, such as data appliance 102, may be unable to prevent app 130 from being installed on device 104 (e.g., because a comparison of a hash of app 130 matches a hash of app 150 that was previously confirmed to be not-malicious by service 122).

In various embodiments, cloud security service 122 includes a C&C pattern generation system 132. The C&C pattern generation system is configured to collect and coordinate information obtained through sample analysis (e.g., as stored in database 140 and/or storage 142) and information received from traffic analysis (e.g., as reported by data appliances 102, 136, and/or 148) regarding C&C domains/channels. As with other components of cloud security service 122, the C&C pattern generation system can comprise a single component, can comprise multiple components working in cooperation, and/or its functionality can be provided by a third party (and work in cooperation with components of service 122), etc., as applicable.

Figure 7:
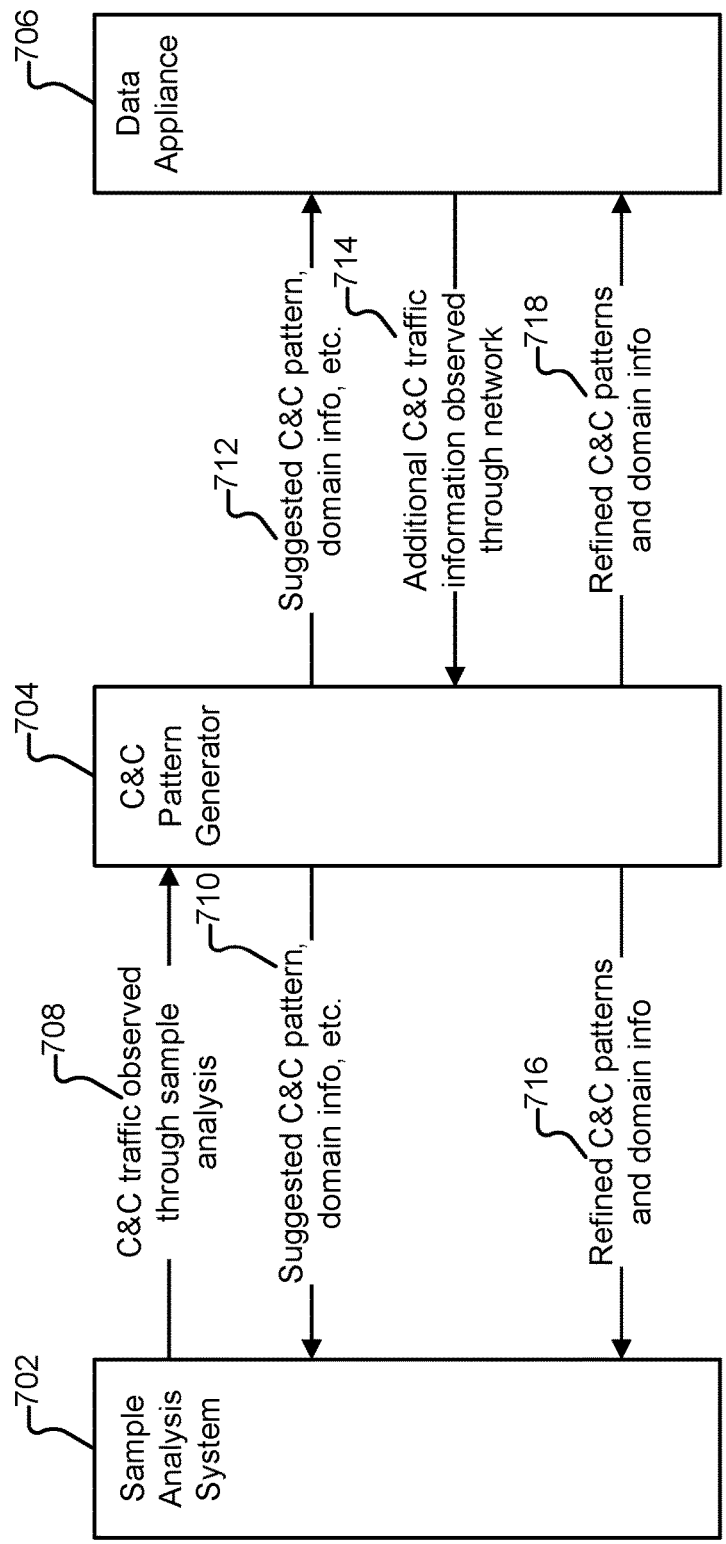
FIG. 7 illustrates example interactions between a sample analysis system, a C&C pattern generation system, and a data appliance, in accordance with various embodiments.

FIG. 7 illustrates example interactions between a sample analysis system, a C&C pattern generation system, and a data appliance, in accordance with various embodiments. C&C pattern generation system 704 (an example of which is C&C pattern generation system 132) combines information collected by sample analysis system 702 and data appliance 706. An example of sample analysis system 702 is sample analysis system 300. Sample analysis system 702 collects information related to C&C traffic and transmits the information to C&C pattern generation system 704 (708). Examples of such traffic information include domain, URL, and/or pcap information observed during static/dynamic analysis of a sample, such as app 130.

The C&C pattern generation system (704) analyzes the C&C traffic information collected by sample analysis system 702, including by correlating information across samples. The output of the analysis performed by the C&C pattern generation system is a set of abstracted C&C URL patterns and associated domain(s), also referred to herein as a "C&C (channel) profile." One example format for such a profile is JSON. The C&C pattern generation system (704) transmits C&C channel profiles to both sample analysis systems (e.g., sample analysis system 300) (710) and data appliances (e.g., data appliance 706, examples of which include data appliances 102, 136, and 148) (712). Sample analysis system 702 uses the received C&C channel profiles as a trigger to detect additional C&C traffic. The profiles can be used in future executions of static/dynamic analysis (e.g., against new samples) and in various embodiments can also be used to retroactively refine existing information (e.g., stored in static analysis/dynamic analysis reports).

Data appliance 706 can similarly use the received C&C channel profiles to keep track of network traffic associated with known C&C channels as it observes network traffic (e.g., flowing through appliance 102). When data appliance 706 observes any traffic that is associated with a given C&C profile but not included in the profile, the data appliance can send additional information to the C&C pattern generation system (714). The C&C pattern generation system can use the information provided by the data appliance to revise the C&C profile/make it more complete.

As one example, suppose data appliance 706 observes traffic to a domain (www.exampledomain.com) that uses an existing C&C URL pattern (e.g., traffic to or from www.exampledomain.com/slkqwejuf.php and www.exampledomain.com/2kwqjs.php is observed by data appliance 706). Data appliance 706 was previously provided by C&C pattern generation system 704 with a C&C profile that included the URL patterns "../slkqwejuf.php" and "../2kwqjs.php" (along with domains known to be using the URL patterns—www.otherdomain.com and www.anotherdomain.com). The domain, www.exampledomain.com was not included in the profile previously provided to data appliance 706. When data appliance 706 observes a pattern, such as to "../slkqwejuf.php" or "../2kwqjs.php," traffic, appliance 706 reports the newly observed domain (www.exampledomain.com) to C&C pattern generation system 704 (714) as potentially newly observed C&C traffic (e.g., indicative of an existing C&C family expanding to an additional domain). Similarly, data appliance 706 may observe traffic associated with new patterns associated with an existing domain (e.g., one already included in one or more C&C profiles) and report that information to C&C pattern generation system 704.

As one example, suppose an existing C&C profile indicates that the domain www.ACMESDK.com has associated with it the URL patterns "../regix.php" and "../hkj432.php." If data appliance 706 observes traffic to/from www.ACMESDK.com/ojsk3usl.php (a pattern that is not included in the profile), data appliance 706 can report (714) its observation in traffic of a potentially new pattern for inclusion in the profile. As applicable (e.g., based on the processing of information received from data appliance 706), C&C pattern generation system 704 can refine its set of C&C profiles and provide updated information to sample analysis system 702 (716) and data appliance 706 (718).

C&C pattern generation system 704 can use a variety of techniques in determining whether a new pattern and/or new domain should be included in an existing C&C profile. As one example, C&C pattern generation system 704 can be configured to automatically add new URL patterns (e.g., "./ojsk3usl.php") for domains already included in a profile (e.g., www.ACMESDK.com) whenever such new patterns are observed. A threshold number of reports can also be required before patterns are added to the profile (e.g., requiring at least two data appliances observe/report a new pattern before the corresponding C&C profile is updated to include the new pattern). As another example, suppose a new domain (e.g., "x7dk2hds.com") is observed (e.g., by data appliance 102) to be making use of one or more known C&C patterns (e.g., client 104 is observed attempting to access "x7dk2hds.com/hkj432.php." In various embodiments, observation of single pattern by a new domain can be used to automatically associate the new domain with the existing profile. In other embodiments, other thresholds can also be used (e.g., requiring multiple data appliances to observe the new domain accessing known C&C patterns, and/or requiring that multiple patterns (e.g., "x7dk2hds.com/hkj432.php" and "x7dk2hds.com/ojsk3usl.php") be observed before concluding that the newly observed domain is associated with an existing C&C family.

In various embodiments, sample analysis system 702 uses information received at 716 to revise existing verdicts about samples. As one example, suppose sample analysis system 702 receives an update from C&C pattern generator 704 that indicates that an existing C&C profile should be expanded to include two additional patterns (e.g., "../28dj28eh.php" and "../tmp/regixtration.php"). Sample analysis system 702 can determine which samples (e.g., app 150) were previously determined (e.g., through static and/or dynamic analysis) to make use of a C&C channel associated with the C&C profile and automatically perform a new round of dynamic analysis with respect to the sample. Suppose the sample was previously determined to be not-malicious, but now, during dynamic analysis, is determined to leak GPS information. The sample's verdict can be updated to "malicious" accordingly. Additionally, any other samples known (e.g., through static analysis) to use the same C&C channel can have their verdicts updated to "malicious" as well, based on the information received from C&C pattern generator 704.

Figure 8:
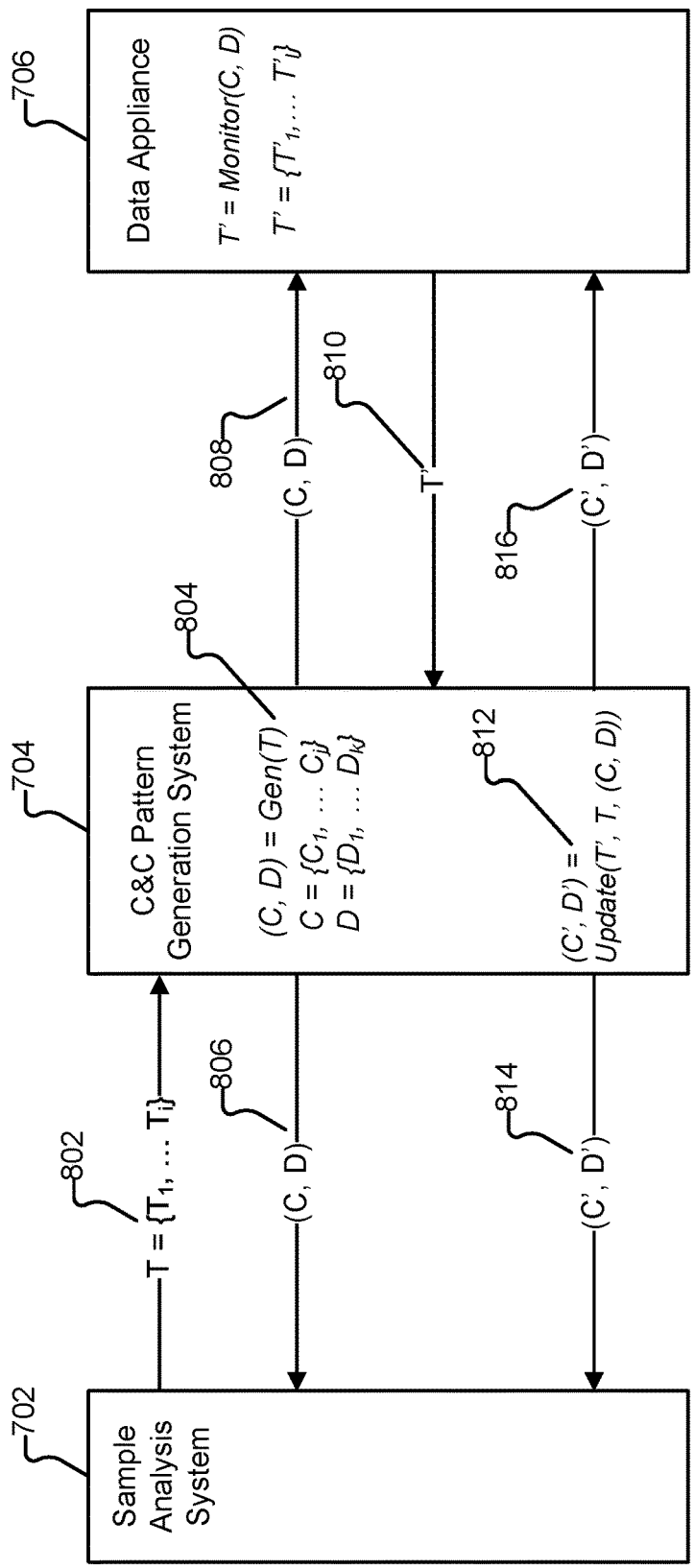
FIG. 8 illustrates an example data exchange between a sample analysis system, a C&C pattern generation system, and a data appliance, in accordance with various embodiments.

FIG. 8 illustrates an example data exchange between a sample analysis system, a C&C pattern generation system, and a data appliance, in accordance with various embodiments. In the example shown in FIG. 8, sample analysis system 702 observes traffic (T) during sample analysis and transmits it (802) to C&C pattern generator 704 (e.g., with $T_1$ being traffic observed with respect to a first sample, $T_2$ being traffic observed with respect to a second sample, etc.). C&C pattern generator 704 analyzes the received traffic T to determine a set of C&C family profiles (804), where each family profile includes a set of URL patterns (C) and domains (D). C&C pattern generator 704 transmits the C&C profiles both back to sample analysis system 702 (806) and data appliance 706 (808). As explained above, data appliance 706 can use the received C&C profile to monitor for C&C traffic to/from nodes on its network, and can also report potentially missing URL patterns/domains back to C&C pattern generation system 704 (e.g., as traffic 810). C&C pattern generator 704 can analyze the traffic provided to it by data appliance 706 and update the profiles of any implicated C&C families (e.g., adding to the set of URL patterns and/or the list of domains associated with the family) as applicable (812). The C&C pattern generator can then transmit updated profiles to sample analysis system 702 (814) and data appliance 706 (816).

Figure 9:
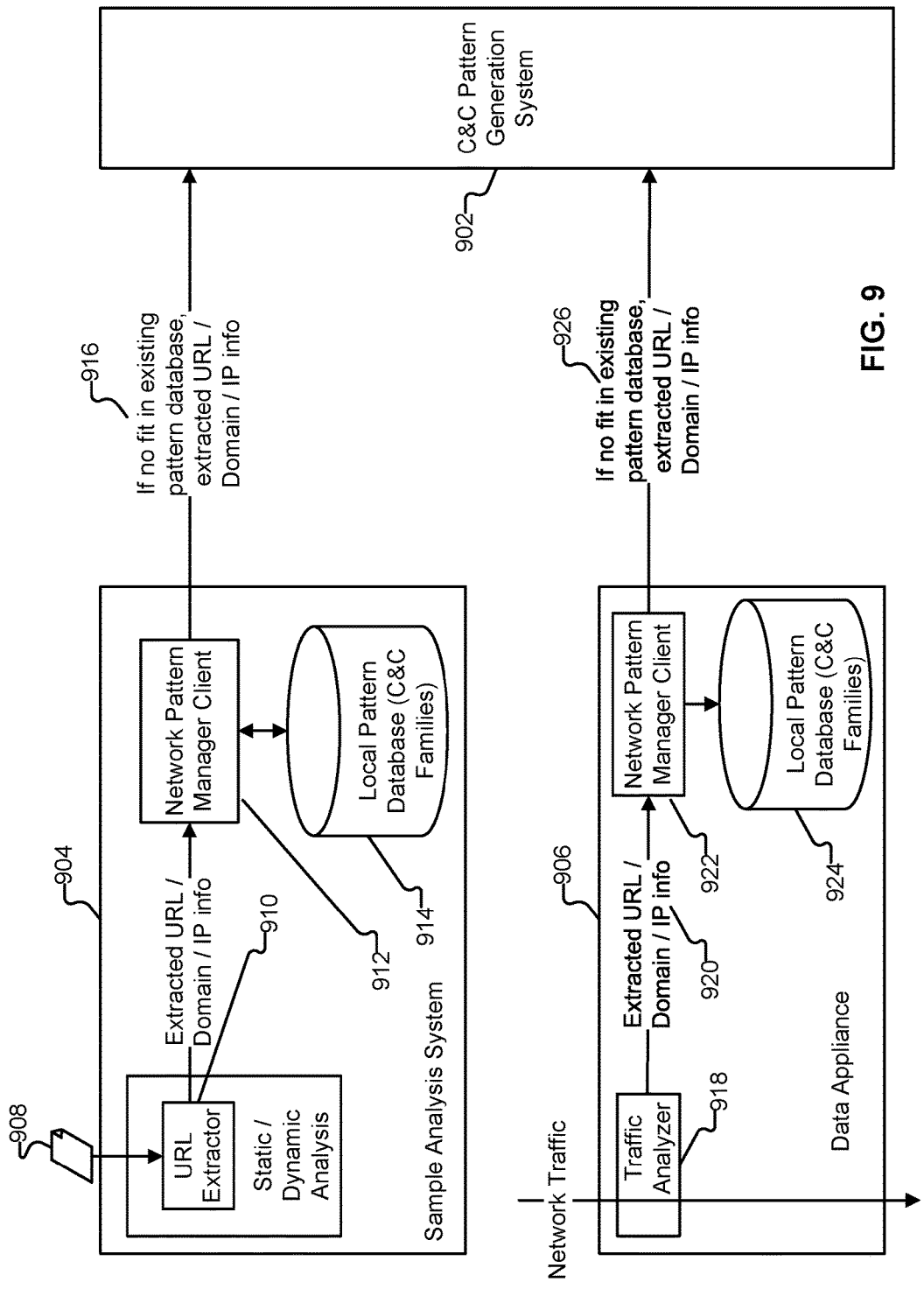
FIG. 9 illustrates an example of how a C&C pattern generation system collects knowledge about C&C channels in accordance with various embodiments.

FIG. 9 illustrates an example of how a C&C pattern generation system collects knowledge about C&C channels in accordance with various embodiments. In particular, in the example shown, a C&C pattern generation system 902 is in communication with a sample analysis system 904 and a data appliance 906.

Sample analysis system 904 receives a sample 908 (e.g., in conjunction with processes 400 and/or 600). In various embodiments, as part of the static/dynamic analysis performed on the sample by system 904, URLs (e.g., hardcoded into the application and/or accessed by the sample during dynamic analysis) are obtained by one or more URL extractors 910. One example of a URL extractor 910 is a script that examines static analysis report 308 and dynamic analysis report 312 for a given sample when sample analysis is performed. Network pattern manager client 912 receives the extracted URL information and determines whether the extracted information corresponds to information about any known C&C families, by querying a local repository 914 of C&C channel information (e.g., where the repository 914 is provided by C&C pattern generation system 902 to sample analysis system 904). In the event that the extracted URL information does not correspond to a known C&C family, the extracted URL information is provided by sample analysis system 904 to C&C pattern generation system 902 (916).

As shown in FIG. 9, data appliance 906 analyzes traffic (e.g., via components logically depicted collectively as traffic analyzer 918). In various embodiments, URLs accessed by nodes on the network that data appliance 906 monitors (or attempts made by those nodes to access URLs) are extracted and provided to network pattern manager client 922 (920). Network pattern manager client 922 receives the extracted URL information and determines whether the extracted information corresponds to information about any known C&C families, by querying a local repository 924 of C&C channel information (e.g., where the repository 924 is provide by C&C pattern generation system 902 to data appliance 906). In the event that the extracted URL information does not correspond to a known C&C family, the extracted URL information is provided by data appliance 906 to C&C pattern generation system 902 (926).

An example of messaging that can be exchanged (e.g., in accordance with various aspects described in conjunction with aspects of FIGS. 7-9) is as follows. Suppose sample analysis system 702 analyzes a sample and detects a URL that leaks the location of a user of the app being analyzed. Such information might be captured and stored with the sample analysis system as follows:
'url':'ib.adnxs.com/ttj%3fid=5658267%26cb=622777%26pubclick=http://click-east.acuityplatform.com/adserver/landing********%261at=36.07207%261ong=-115.04842%26sw=0%26sh=0%26dt=2%26int=0%26devid=9937525%261andingurl='

Sample analysis system 702 extracts the C&C pattern ("../tjj") from the URL for the "adnxs.com" domain and sends the information to C&C pattern generation system 704 (e.g., using the following JSON format): {"domain": "adnxs.com", "C2_pattern": ["ib.adnxs.com/ttj", "status": "new"]}. The status "new" indicates that the pattern is a newly seen (by sample analysis system 702) C&C pattern.

C&C pattern generation system 704 can update its records and provide the C&C pattern to data appliance 706 in the same format: {"domain": "adnxs.com", "C2_pattern": ["ib.adnxs.com/ttj", "status": "new"]}. Data appliance 706 updates its local repository of C&C patterns accordingly, and, as data appliance 706 observes more C&C traffic for the adnxs.com domain, it can return any additional patterns it observes back to the C&C pattern generation system. As one example, data appliance 706 can provide C&C pattern generation system 704 with the following:
{"domain": "adnxs.com", "C2_URLs": ["sin1.g.adnxs.com/if%3fe=wqt%5f3qkcbah5agaaagdwaaui8syrtquq04****", "sin1.g.adnxs.com/referrer=http://www.ebay.com/%26bdref=http**", "nym1.ib.adnxs.com/s=a34bd649580584a3b05fe41b0e4bfbe3604afb1d****"], "status": "add"}
indicating additional C&C patterns used by adnxs.com that should be added to the profile for the family that includes adnxs.com.

C&C pattern generation system 704 merges the C&C patterns provided to it by data appliance 706 with the associated existing profile and returns an updated set of refined C&C patterns to both sample analysis system 702 and data appliance 706 (indicating they should update their respective records):
{"domain": "adnxs.com", "C2_pattern": ["ib.adnxs.com/ttj", "sin1.g.adnxs.com/if", "sin1.g.adnxs.com/referrer=", "nym1.ib.adnxs.com/s="], "status": "update"}

Figure 10:
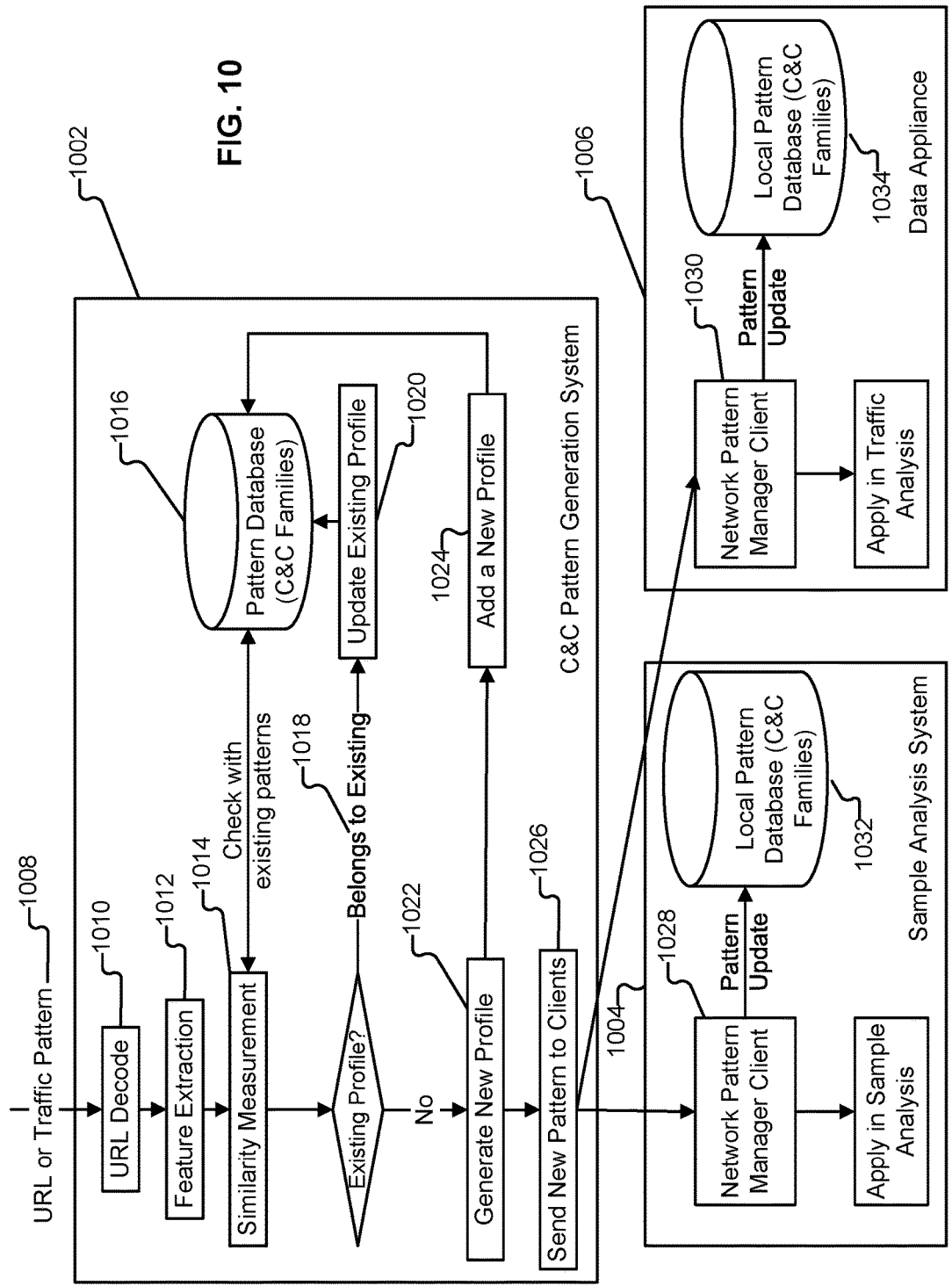
FIG. 10 illustrates an example of processing performed by a C&C pattern generation system.

FIG. 10 illustrates an example of processing performed by a C&C pattern generation system in accordance with various embodiments. In particular, a variety of python, Java, and/or other scripts/programs can be used by C&C pattern generation system 1002 to perform the various depicted actions. In the example shown, C&C pattern generation system 1002 receives either a set of one or more URLs (e.g., from sample analysis system 904) or a pcap file (e.g., from data appliance 906). URL decoding is performed (1010) to extract any URLs included in the data received. C&C pattern generation system 1002 then tokenizes/otherwise prepares the extracted information into a canonical format (e.g., determining IP addresses, domain names, URL patterns, and user agent information from the received information) (1012).

At 1014, the C&C pattern generation system determines a similarity measurement regarding the extracted information and existing profiles (e.g., stored in pattern database 1016). If the extracted information is sufficiently similar to a C&C pattern family already stored in pattern database (1018), the existing pattern (i.e. the profile stored in database 1016) is updated with the newly received information (1020). If the extracted information is not sufficiently similar to any existing entries in the C&C pattern database (e.g., an existing C&C family), a new profile for a new C&C pattern family can be created (1022) and added to pattern database 1016 (1024).

A variety of approaches can be used to determine whether or not the newly received URL information is sufficiently similar to an existing C&C family or not. As one example, heuristics can be used. Suppose an existing C&C family profile exists in database 1016 and that the existing profile includes (among other components) the domain "www.exampleSDK.com," the IP address "199.167.52.137," and URL patterns "../ksksk2.php," "../qkcxp3kwq.php." and "../ttkwhsa.php." Other information can also be included in the profile, such as user agent strings. Also suppose that the information received at 1008 includes the URL "www.exampleSDK.com/hyykwsd.php." In various embodiments, the presence of the underlying domain www.exampleSDK.com in an existing C&C family profile will result in a match between the new information and the existing profile. Other approaches can also be used for determining similarity, such as a global uniqueness (e.g., with very commonly used patterns like "register.php" and "checkout.php" being excluded from profiles), edit distance, etc.

Whenever database 1016 is updated, C&C pattern generation system 1002 can push or otherwise provide updates to sample analysis system 1004 and/or data appliance 1006 (1026) (e.g., via their respective clients 1028 and 1030) which in turn can update their respective local pattern databases (1032, 1034) and deploy their respective updated databases in future analysis. In various embodiments, data appliances are configured to perform passive monitoring for a period of time after updates are received (e.g., an update received in conjunction with C&C pattern generation system 1002 transmitting at 1026), using the newly received C&C information. During this time period, the data appliance can perform false positive testing (e.g., by enforcing the older version of the C&C profile and passively monitoring using a revised version). False positives can be reported back to C&C pattern generation system 102 (or another appropriate entity, such as an administrator of the data appliance). And, after a period of time (e.g., one day) of successful testing, the revised C&C pattern can be put into active use by the data appliance.

Figure 11:
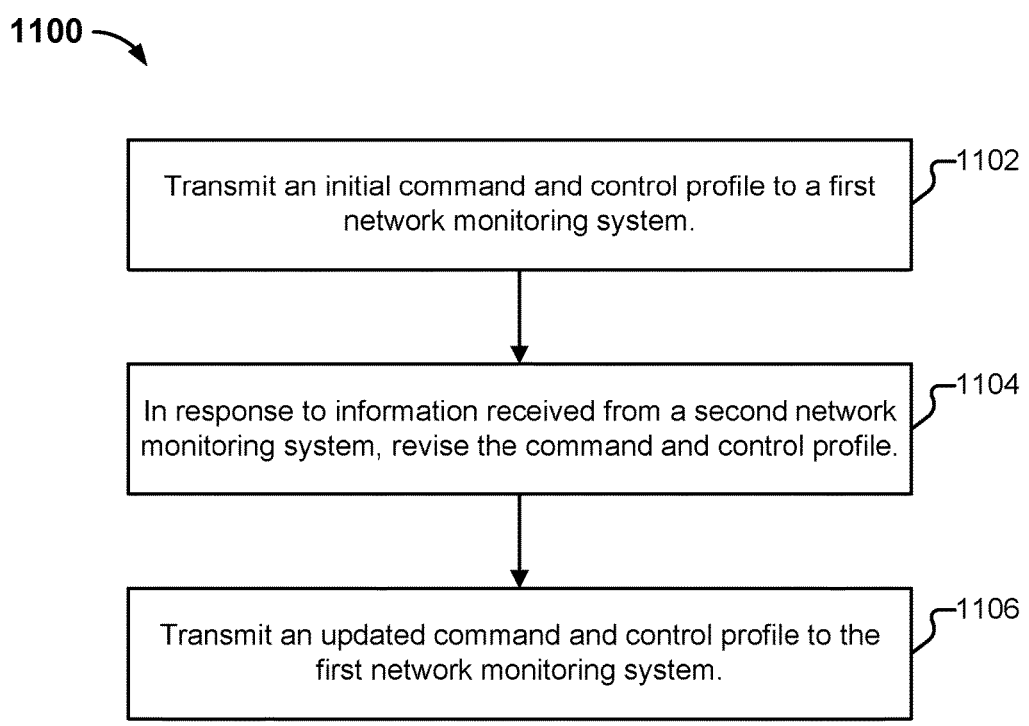
FIG. 11 illustrates an example of a process for maintaining a current C&C profile.

FIG. 11 illustrates an embodiment of a process for maintaining a current C&C profile. In various embodiments, process 1100 is performed by C&C pattern generation system 132. The process begins at 1102 when an initial C&C profile is transmitted to a first network monitoring system. As one example, C&C pattern generation system 902 transmits a profile to data appliance 906 (e.g., for storing in database 924) at 1102. When C&C pattern generation system 902 receives additional information associated with the profile (e.g., identification of a new domain using the patterns, and/or new patterns observed from a domain already included in the profile), C&C pattern generation system 902 revises the profile at 1104. The additional information can come from the same data appliance that received the profile at 1102 and can also come from a different data appliance. And, portions 1102 and 1104 of process 1100 can be performed by a C&C pattern generation system with respect to multiple data appliances at the same time. For example, at 1102, C&C pattern generation system 132 can send profiles to each of data appliances 102, 136, and 148. When any of the data appliances observes additional information about a domain/pattern associated with the profile, it can provide the observation to C&C pattern generation system 132 which will revise the profile accordingly (at 1104). Finally, at 1106, C&C pattern generation system 132 provides updated C&C profiles (at 1106) to the data appliances. As previously mentioned, the C&C pattern generation system can also send the updated C&C profiles to other nodes (e.g., at 1106), such as sample analysis system 904.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
transmit an initial communication and control profile to a first network monitoring system, wherein the initial communication and control profile includes at least one domain, extracted from a first application sample comprising at least one file during at least one of: a static analysis and a dynamic analysis of the first application sample, and corresponding to a communication and control channel;
at least in part in response to information received from a second network monitoring system that is different from the first network monitoring system, revise the initial communication and control profile and change a verdict associated with a second application sample that is different from the first application sample; and transmit an updated communication and control profile to the first network monitoring system; and
a memory coupled to the processor and configured to provide the processor with instructions.

2. The system of claim 1 wherein the processor is further configured to transmit the initial communication and control profile to an application sample analysis system.

3. The system of claim 1 wherein the processor is further configured to transmit the updated communication and control profile to an application sample analysis system.

4. The system of claim 1 wherein the first network monitoring system comprises a data appliance.

5. The system of claim 1 wherein the initial communication and control profile is created at a communication and control pattern generation system in response to a message from an application sample analysis system.

6. The system of claim 1 wherein the information received from the second network monitoring system comprises an additional domain corresponding to the initial communication and control profile.

7. The system of claim 1 wherein the information received from the second network monitoring system comprises an additional pattern corresponding to the initial communication and control profile.

8. The system of claim 1 wherein the information received from the second network monitoring system is obtained by the second network monitoring system from observed network traffic.

9. The system of claim 1 wherein the initial communication and control profile comprises at least one of: a plurality of communication and control patterns, and a plurality of communication and control domains.

10. The system of claim 1 wherein the initial communication and control profile is built in response to analysis of a plurality of application samples by an application sample analysis system.

11. The system of claim 1 wherein the processor is further configured to determine that a first communication and control profile and a second communication and control profile should be merged into a merged communication and control profile.

12. The system of claim 1 wherein the first network monitoring system is configured to continue to use the initial communication and control profile for a period of time while passively monitoring using the updated communication and control profile.

13. The system of claim 12 wherein, after the period of time has elapsed, the first network monitoring system stops using the initial communication and control profile and starts actively monitoring using the updated communication and control profile.

14. A method, comprising:
transmitting an initial communication and control profile to a first network monitoring system, wherein the initial communication and control profile includes at least one domain, extracted from a first application sample comprising at least one file during at least one of: a static analysis and a dynamic analysis of the first application sample, and corresponding to a communication and control channel;
at least in part in response to information received from a second network monitoring system that is different from the first network monitoring system, revising the initial communication and control profile and changing a verdict associated with a second application sample that is different from the first application sample; and transmitting an updated communication and control profile to the first network monitoring system.

15. The method of claim 14 wherein the information received from the second network monitoring system comprises an additional domain corresponding to the initial communication and control profile.

16. The method of claim 14 wherein the information received from the second network monitoring system comprises an additional pattern corresponding to the initial communication and control profile.

17. A computer program product embodied in a non-transitory computer readable storage medium and comprising computer instructions for:

transmitting an initial communication and control profile to a first network monitoring system, wherein the initial communication and control profile includes at least one domain, extracted from a first application sample comprising at least one file during at least one of: a static analysis and a dynamic analysis of the first application sample, and corresponding to a communication and control channel;

at least in part in response to information received from a second network monitoring system that is different from the first network monitoring system, revising the initial communication and control profile and changing a verdict associated with a second application sample that is different from the first application sample; and transmitting an updated communication and control profile to the first network monitoring system.

18. The method of claim 14 further comprising transmitting the initial communication and control profile to an application sample analysis system.

19. The method of claim 14 further comprising transmitting the updated communication and control profile to an application sample analysis system.

20. The method of claim 14 wherein the first network monitoring system comprises a data appliance.

21. The method of claim 14 wherein the initial communication and control profile is created at a communication and control pattern generation system in response to a message from an application sample analysis system.

22. The method of claim 14 wherein the information received from the second network monitoring system is obtained by the second network monitoring system from observed network traffic.

23. The method of claim 14 wherein the initial communication and control profile comprises at least one of: a plurality of communication and control patterns, and a plurality of communication and control domains.

24. The method of claim 14 wherein the initial communication and control profile is built in response to analysis of a plurality of application samples by an application sample analysis system.

25. The method of claim 14 further comprising determining that a first communication and control profile and a second communication and control profile should be merged into a merged communication and control profile.

26. The method of claim 14 wherein the first network monitoring system is configured to continue to use the initial communication and control profile for a period of time while passively monitoring using the updated communication and control profile.

27. The method of claim 26 wherein, after the period of time has elapsed, the first network monitoring system stops using the initial communication and control profile and starts actively monitoring using the updated communication and control profile.

* * * * *